United States Patent
McLaughlin et al.

(10) Patent No.: US 10,717,682 B2
(45) Date of Patent: Jul. 21, 2020

(54) FERTILIZERS CONTAINING SLOW AND FAST RELEASE SOURCES OF BORON

(71) Applicant: The Mosaic Company, Plymouth, MN (US)

(72) Inventors: Michael McLaughlin, Montacute (AU); Jozefien Degryse, Parkside (AU); Roslyn Baird, Aberfoyle Park (AU); Rodrigo Coqui da Silva, Redwood Park (AU); Kyle Freeman, Plymouth, MN (US); Thomas Fry, St. Louis Park, MN (US)

(73) Assignee: The Mosaic Company, Plymouth, MN (US)

( * ) Notice: Subject to any disclaimer, the term of this patent is extended or adjusted under 35 U.S.C. 154(b) by 0 days.

(21) Appl. No.: 15/943,161

(22) Filed: Apr. 2, 2018

(65) Prior Publication Data

US 2018/0290940 A1    Oct. 11, 2018

Related U.S. Application Data

(60) Provisional application No. 62/479,948, filed on Mar. 31, 2017.

(51) Int. Cl.
   *C05D 9/00*   (2006.01)
   *C05D 9/02*   (2006.01)
   (Continued)

(52) U.S. Cl.
   CPC ............. *C05D 9/00* (2013.01); *C05D 1/02* (2013.01); *C05D 9/02* (2013.01); *C05B 7/00* (2013.01);
   (Continued)

(58) Field of Classification Search
   None
   See application file for complete search history.

(56) References Cited

U.S. PATENT DOCUMENTS

| | | | |
|---|---|---|---|
| 2,935,387 | A | 5/1960 | Phillips |
| 3,005,696 | A | 10/1961 | Hignett |

(Continued)

FOREIGN PATENT DOCUMENTS

| | | | |
|---|---|---|---|
| CN | 1417170 A | 5/2003 | |
| CN | 101648838 A | 2/2010 | |

(Continued)

OTHER PUBLICATIONS

Office Action dated Dec. 28, 2016 for Israeli Application No. 230764, 2 pages.

(Continued)

*Primary Examiner* — Wayne A Langel
(74) *Attorney, Agent, or Firm* — Patterson Thuente Pedersen, P.A.

(57) ABSTRACT

A granular fertilizer product having at least two sources of boron having different solubilities to tailor boron availability during the entire growing season of a plant, while reducing the risk of boron toxicity. A first source of boron can include a sodium-based or highly water soluble boron compound such as sodium tetraborate and/or boric acid, while a second source of boron can include a calcium-based boron compound such as colemanite ($CaB_3O_4(OH)_3 \cdot (H_2O)$) (e.g. when the carrier fertilizer is N- or K-based) and/or boron phosphate ($BPO_4$) (e.g. when the carrier fertilizer is P-based). The solubility of the first source of boron is higher than the solubility of the second source of boron such that the sources of boron have different release rates into the soil.

18 Claims, 8 Drawing Sheets

(51) Int. Cl.
  *C05D 1/02*    (2006.01)
  *C05C 9/00*    (2006.01)
  *C05C 11/00*   (2006.01)
  *C05B 7/00*    (2006.01)
  *C05G 5/12*    (2020.01)

(52) U.S. Cl.
  CPC ............... *C05C 9/00* (2013.01); *C05C 11/00* (2013.01); *C05G 5/12* (2020.02)

(56) References Cited

U.S. PATENT DOCUMENTS

| | | | |
|---|---|---|---|
| 3,135,473 A | 6/1964 | Schrader et al. | |
| 3,560,381 A * | 2/1971 | Winters | A62D 1/0014 252/1 |
| 3,655,357 A * | 4/1972 | Ray | C05B 17/00 71/1 |
| 3,794,478 A * | 2/1974 | Dirksen | C05D 1/02 71/1 |
| 3,961,932 A | 6/1976 | Miller | |
| 4,025,329 A | 5/1977 | Goertz | |
| 4,045,204 A | 8/1977 | Matsunaga | |
| 4,154,593 A | 5/1979 | Brown et al. | |
| 4,332,609 A | 6/1982 | Ott | |
| 4,758,261 A | 7/1988 | Parker et al. | |
| 4,789,391 A | 12/1988 | Detroit | |
| 4,797,265 A | 1/1989 | Inoue et al. | |
| 4,832,728 A | 5/1989 | Allan et al. | |
| 5,120,345 A | 6/1992 | Kayaert et al. | |
| 5,630,861 A | 5/1997 | Yaniv | |
| 5,653,782 A | 8/1997 | Stern et al. | |
| 6,179,893 B1 | 1/2001 | Bendix et al. | |
| 6,241,796 B1 | 6/2001 | Jardine | |
| 6,254,655 B1 | 7/2001 | Goertz | |
| 6,379,414 B1 | 4/2002 | Kleine-Kleffmann et al. | |
| 6,517,600 B1 | 2/2003 | Dinel | |
| 6,544,313 B2 | 4/2003 | Peacock et al. | |
| 6,936,087 B2 | 8/2005 | Wommack et al. | |
| 7,497,891 B2 | 3/2009 | Peacock | |
| 7,727,501 B2 | 6/2010 | Ferguson et al. | |
| 7,789,932 B2 | 9/2010 | Anderson et al. | |
| 8,282,898 B2 | 10/2012 | Phinney | |
| 8,323,371 B2 | 12/2012 | Phinney | |
| 9,162,932 B2 | 10/2015 | Peacock et al. | |
| 9,266,784 B2 * | 2/2016 | Ferguson | C05D 1/02 |
| 2002/0178772 A1 | 12/2002 | Hince | |
| 2004/0237615 A1 * | 12/2004 | Green | A01C 1/06 71/28 |
| 2005/0036929 A1 | 2/2005 | Ferguson et al. | |
| 2006/0084573 A1 * | 4/2006 | Grech | C05B 7/00 504/101 |
| 2009/0048319 A1 * | 2/2009 | Kohle | A01N 43/50 514/383 |
| 2009/0270257 A1 | 10/2009 | Pursell et al. | |
| 2010/0040882 A1 | 2/2010 | Phinney | |
| 2010/0240533 A1 | 9/2010 | Varadachari | |
| 2010/0291237 A1 * | 11/2010 | Cook | C03C 1/026 424/657 |
| 2011/0214465 A1 | 9/2011 | Peacock et al. | |
| 2012/0036906 A1 | 2/2012 | Pedersen | |
| 2012/0067094 A1 * | 3/2012 | Pursell | C05C 9/005 71/29 |
| 2013/0031943 A1 | 2/2013 | Ferguson et al. | |
| 2013/0143737 A1 * | 6/2013 | Varadachari | C05B 13/06 504/101 |
| 2013/0219979 A1 * | 8/2013 | Deb | C05G 3/0041 71/27 |
| 2013/0230605 A1 | 9/2013 | Ceulemans et al. | |
| 2014/0007633 A1 * | 1/2014 | Tang | C05C 9/00 71/28 |
| 2014/0083148 A1 * | 3/2014 | Kuo | C05B 7/00 71/23 |
| 2014/0109639 A1 * | 4/2014 | Taylor | C05D 9/00 71/32 |
| 2014/0260467 A1 | 9/2014 | Peacock et al. | |
| 2014/0274719 A1 * | 9/2014 | Davison | C05G 3/00 504/297 |
| 2015/0158776 A1 * | 6/2015 | Wells | C05B 7/00 71/23 |
| 2016/0168040 A1 | 6/2016 | Ferguson et al. | |
| 2017/0283334 A1 * | 10/2017 | Rohrer | C05D 9/02 |
| 2019/0127286 A1 * | 5/2019 | Tyree | A01G 31/00 |

FOREIGN PATENT DOCUMENTS

| | | |
|---|---|---|
| CN | 104163709 A | 11/2014 |
| EP | 2248790 A1 | 11/2010 |
| RU | 2182142 C1 | 5/2002 |
| SU | 10022774 A1 | 3/1983 |
| SU | 1428748 A1 | 10/1988 |
| WO | WO 2012/063091 * | 5/2012 |
| WO | WO 2013/019935 A2 | 2/2013 |

OTHER PUBLICATIONS

Communication dated Oct. 31, 2016 for Russian Application No. 2014108161, 6 pages.
Office Action dated Apr. 28, 2017 for Malaysian Application No. PI2014000305, 3 pages.
Office Action dated Jan. 17, 2017 for Chilean Application No. 201400279, 8 pages.
Office Action dated Mar. 1, 2018 for Russian Application No. 2015143988, 8 pages.
Office Action dated Jun. 23, 2017 for Mexican Application No. MX/a/2014/001394, 4 pages.
Office Action dated Oct. 12, 2017 for Mexican Application No. MX/a/2014/001394, 4 pages.
Office Action dated Dec. 14, 2017 for Australian Application No. 2014236424, 3 pages.
Office Action dated Dec. 8, 2017 for Belarus Application No. a20140139, 4 pages.
Office Action dated Jan. 4, 2018 for Indian Application No. 1046/DELN/2014, 6 pages.
Office Action dated Jan. 2, 2018 for Israeli Application No. 241046, 3 pages.
Office Action dated Mar. 26, 2018 for Mexican Application No. MX/a/2014/001394, 3 pages.
Office Action dated Apr. 23, 2018 for Chinese Application No. 20140014742.8, 6 pages.
Search Report dated Mar. 23, 2015 for European Application No. 12819517.9, 6 pages.
Application and File history for U.S. Appl. No. 13/567,645, filed Aug. 6, 2012. Inventors: Ferguson et al.
Application and File history for U.S. Appl. No. 15/050,659, filed Feb. 23, 2016. Inventors: Ferguson et al.
Office Action dated Jun. 25, 2015 for Canadian Application No. 2,784,661, 3 pages.
Office Action dated Jun. 30, 2015 for Chinese Application No. 201280049326.2, 3 pages.
Office Action dated Sep. 14, 2015 for New Zealand Application No. 620866, 2 pages.
Search Report and Written Opinion dated Jul. 28, 2014 for PCT Application No. PCT/US2014/028565, 12 pages.
Mosaic AgriFacts® for Aspire®, Printout from web page www.aspirepotash.com/performance, last visited Sep. 23, 2015, 7 pages.
Office Action dated Aug. 22, 2014 for Canadian Patent Application No. 2,784,661, 3 pages.
Office Action dated Nov. 17, 2014 for New Zealand Patent Application No. 620866, 2 pages.
Office Action dated Dec. 1, 2014 for Chinese Patent Application No. 201280049326.2, 3 pages.
International Preliminary Report on Patentability dated Feb. 4, 2014 for PCT Application No. PCT/US2012/049301, 7 pages.
Swift Brochure, known to Applicant at least as of Nov. 19, 2013, 3 pages.
Korn-Kali®+B Technical Data Sheet, Mar. 15, 2012, 1 page.

(56) References Cited

OTHER PUBLICATIONS

Malaysia and Indonesia: Korn-Kali+B—A four nutrient Fertiliser for the Oil Palm, Dec. 17, 2008, 2 pages.
PCT Search Report dated Feb. 22, 2013 for PCT Application No. PCT/US2012/049301, 10 page.
Office Action dated Feb. 29, 2016 for Canadian Application No. 2,784,661, 3 pages.
Office Action dated Mar. 17, 2016 for New Zealand Application No. 620866, 2 pages.
Office Action dated Apr. 26, 2016, for Japanese Application No. 2014-524067, 5 pages.
Office Action dated Jun. 3, 2016, 2015 for New Zealand Application No. 620866, 2 pages.
Office Action dated Jul. 4, 2016, 2015 for Chinese Application No. 201280049326.2, 7 pages.
Office Action dated Aug. 16, 2016, 2015 for Chilean Application No. 201400279, 8 pages.
Office Action dated Aug. 2, 2016, 2015 for Australian Application No. 2012290064, 3 pages.
Search Report and Written Opinion dated Jul. 26, 2018 for PCT Application No. PCT/US2018/025499, 11 pages.
Office Action dated Aug. 2, 2018, for Belarus Application No. a20140139, 7 pages.
Office Action dated Aug. 16, 2018, for EP Application No. 12819517.9, 5 pages.
Office Action dated Jan. 16, 2019, for Bangladesh Application No. 105/2018, 1 page.

\* cited by examiner

FERTILIZERS CONTAINING SLOW AND FAST RELEASE SOURCES OF BORON

RELATED APPLICATIONS

The present application claims the benefit of U.S. Provisional Application No. 62/479,948 filed Mar. 31, 2017, which is hereby incorporated herein in its entirety by reference. The present application is related to U.S. Pat. No. 9,266,784, which claims the benefit of U.S. Provisional Application No. 61/514,952 filed Aug. 4, 2011, both of which are incorporated herein in their entirety by reference.

TECHNICAL FIELD

The invention relates generally to fertilizer compositions. More specifically, the invention relates to incorporation of at least two different sources of boron into a macronutrient carrier fertilizer as a means of providing plants more timely access to boron.

BACKGROUND

Essential plant nutrients can be divided into two groups, the macronutrients, both primary and secondary, and micronutrients. Plants access primary nutrients including nitrogen, phosphorus, and potassium from the soil and hence they make up the major part of fertilizers used to supplement soils that are lacking in these nutrients.

According to the conventional fertilizer standards, the chemical makeup or analysis of fertilizers is expressed in percentages (by weight) of the essential primary nutrients nitrogen, phosphorus, and potassium. More specifically, when expressing the fertilizer formula, the first value represents the percent of nitrogen expressed on the elemental basis as "total nitrogen" (N), the second value represents the percent of phosphorus expressed on the oxide basis as "available phosphoric acid" ($P_2O_5$), and the third value represents the percent of potassium also expressed on the oxide basis as "available potassium oxide" ($K_2O$), or otherwise known as the expression (N—$P_2O_5$—$K_2O$).

Even though the phosphorus and potassium amounts are expressed in their oxide forms, there technically is no $P_2O_5$ or $K_2O$ in fertilizers. Phosphorus exists most commonly as monocalcium phosphate, but also occurs as other calcium or ammonium phosphates. Potassium is ordinarily in the form of potassium chloride or sulfate. Conversions from the oxide forms of P and K to the elemental expression (N—P—K) can be made using the following formulas:

% P=% $P_2O_5$×0.437% K=% $K_2O$×0.826

% $P_2O_5$=% P×2.29% $K_2O$=% K×1.21

In addition to the primary nutrients that are made available to plants via fertilizer added to soil, secondary nutrients and micronutrients are also essential for plant growth. These are required in much smaller amounts than those of the primary nutrients. Secondary nutrients include sulfur (S), calcium (Ca), and magnesium (Mg). Micronutrients include, but are not limited to, for example, boron (B), zinc (Zn), manganese (Mn), nickel (Ni), molybdenum (Mo), copper (Cu), iron (Fe), and chlorine (Cl).

Among the micronutrients, boron deficiency is a major concern in many agricultural areas particularly in sandy soils. Fertilization with boron presents a challenge due to the narrow window between nutrient deficiency and toxicity. The amount of boron available to a plant's root zone should be carefully considered as plants are highly sensitive to boron and need only very small amounts. The presence of high levels of boron can pose risks of seedling injury from boron toxicity. Traditional methods of bulk blending boron with fertilizer granules, such as borax, are ineffective or unsuitable due to uneven boron distribution, which can result in too high levels of B close to the granule and deficient levels further away.

To aid in even distribution of boron, the applicant of the present application proposes that different sources of boron added to muriate of potash (MOP) granules before or during compaction, as described in U.S. Pat. No. 9,266,784, reduces the occurrence of boron toxicity and provides an even application of small amounts of boron required by the plant.

Another challenge with respect to boron fertilizer management is providing sufficient boron during all plant growth stages, as this micronutrient plays crucial roles from seedling to flowering. Commonly used sources of soluble boron, such as sodium tetraborate, are highly water soluble and therefore tend to have extremely high mobility in soils compared to most other nutrients, which the exception of nitrate and sulfate, as it is predominately uncharged in most soils. Soluble boron sources can therefore be easily leached from soils before being taken up by the roots, particularly in rainy environments, resulting in boron deficiency later in the growing season, particularly at flowering. It is therefore a difficult balance of providing an appropriate level of boron to ensure the plant is getting the essential nutrient during the growing season while minimizing the occurrence of boron toxicity.

There remains a need for a boron fertilizer product with both fast and slow release characteristics to ensure even and sufficient distribution of boron to the root zone of plants, while reducing the risk of boron toxicity.

SUMMARY OF THE INVENTION

Embodiments of the invention include a NPK fertilizer product having at least two sources of boron having different release rates or characteristics. In embodiments, the NPK fertilizer product can comprise a macronutrient carrier including a nitrogen based fertilizer (e.g. urea), a potassium based fertilizer (e.g. potash or muriate of potash (MOP)), or a phosphate based fertilizer (e.g. mono or di-ammonium phosphate (MAP or DAP)). In one embodiment, a first source of boron is highly soluble, and is therefore a fast release source of boron available to plants in the early stages of the growing season. A second source of boron has lower solubility than the first source, and is therefore a slow release source of boron relative to the first source and is available to plants in the later stages of the growing season. The two sources of boron ensure a more even and continual release of boron than a single source, resulting in increased availability to the root zone of a plant over the course of a growing season, while reducing or eliminating the risk of boron toxicity and seedling injury.

The first source of boron can comprise a highly soluble source or fast release source, such as, for example, a sodium-based or acidic boron source including sodium tetraborate (i.e. borax) and/or boric acid, while the second source of boron can comprise a source having a solubility significantly less than the first source, such as, for example, a calcium-based boron source including colemanite ($CaB_3O_4(OH)_3.(H_2O)$), and/or boron phosphate ($BPO_4$). For P fertilizers, a preferred source of slow release boron is boron phosphate. Specifically with respect to boron phosphate, in embodiments, the solubility can be tailored by heating the reaction product of phosphoric acid and boric acid to different temperatures. Another source of boron having a solubility less than the first source and greater than the second source can include, for example, ulexite ($NaCaB_5O_6(OH)_6.5(H_2O)$), and can be used as a fast release source when combined with slower release boron sources, or a slow release source when combined with faster release boron sources.

The fertilizer product can optionally contain one or more additional sources of micronutrients and/or secondary nutrients, such as, but not limited to, micronutrients including an additional source of boron (B), zinc (Zn), manganese (Mn), molybdenum (Mo), nickel (Ni), copper (Cu), iron (Fe), and/or chlorine (Cl), and/or secondary nutrients including sources of sulfur (S) in its elemental form, sulfur in its oxidized sulfate form ($SO_4$), magnesium (Mg), and/or calcium (Ca), or any of a variety of combinations thereof at various concentrations. The fertilizer can also include a compaction aid, coloring agent, and/or one or more binding ingredients such as sodium hexametaphosphate (SHMP) in the case of a compacted material.

According to one embodiment of the invention in which the carrier comprises a cohered MOP fertilizer, the fertilizer product is prepared by compacting MOP feed material with at least two sources of boron. In another embodiment of the invention, the fertilizer comprises a granulated or prilled nitrogen or phosphate-containing carrier formed by standard granulation processes in which the sources of boron are added within the granulation or prilling circuit.

The above summary of the invention is not intended to describe each illustrated embodiment or every implementation of the present invention. The detailed description that follows more particularly exemplifies these embodiments.

BRIEF DESCRIPTION OF THE DRAWINGS

Subject matter hereof may be more completely understood in consideration of the following detailed description of various embodiments in connection with the accompanying figures, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Embodiments of the invention include a NPK fertilizer product having at least two sources of boron having different release rates or characteristics to tailor boron availability during the entire growing season of a plant, while reducing the risk of boron toxicity.

In embodiments, the NPK fertilizer product can comprise a macronutrient carrier including a nitrogen based fertilizer (e.g. urea), a potassium based fertilizer (e.g. potash or muriate of potash (MOP)), or a phosphate based fertilizer (e.g. mono or di-ammonium phosphate (MAP or DAP)). With respect to MOP carriers, the MOP fertilizer base can be any of a variety of commercially available MOP sources, such as, but not limited to, for example, a MOP feed material having a $K_2O$ content ranging from about 20 weight percent to about 80 weight percent, more particularly about 48 to 62 weight percent, and more particularly about 55 to 62 weight percent.

In one embodiment, a first source of boron is highly soluble, and is therefore a fast release source of boron. A second source of boron has lower solubility than the first source, and is therefore a slow release source of boron. The first source of boron can comprise a highly soluble source or fast release source, such as, for example, a sodium-based boron source including sodium tetraborate (i.e. borax), while the second source of boron can comprise a source having a solubility significantly less than the first source, such as, for example, a calcium-based boron source including colemanite ($CaB_3O_4(OH)_3.(H_2O)$), and/or boron phosphate ($BPO_4$). Regarding boron phosphate specifically, in embodiments, the solubility can be tailored by heating the reaction product of phosphoric acid and boric acid to different temperatures and for different periods of time at a temperature.

Another source of boron having a solubility less than the first source and greater than the second source can include, for example, ulexite ($NaCaB_5O_6(OH)_6.5(H_2O)$), and can be used as a fast release source when combined with slower release boron sources, or a slow release source when combined with faster release boron sources. Table 1 shows the solubility of selected borate compounds.

TABLE 1

Solubility of the different sources of boron:

| Boron Sources | Solubility (mg/L) |
|---|---|
| Sodium borate (borax) | 1504 |
| Ulexite | 886 |
| Colemanite | 538 |
| $BPO_4$ 500° C. 1 h | 285 |
| $BPO_4$ 500° C. 24 h | 225 |
| $BPO_4$ 800° C. 1 h | 75 |
| $BPO_4$ 800° C. 24 h | 59 |

In embodiments, at least two sources of boron are present in an amounts which deliver B from about 0.001 weight percent (wt %) to about 1.0 wt % B in the fertilizer granule, more particularly from about 0.1 wt % to about 0.7 wt %, and more particularly from about 0.3 wt % to about 0.6 wt %. Ratios of fast release boron to slow release boron can be, for example, 5:1, 4:1, 3:1, 2:1, 1:1, 1:2, 1:3, 1:4, or 1:5, or any of a variety of ratios tailored to the plant needs.

The fertilizer product, in the case of a cohered, compacted granule, can also include one or more binding agents or ingredients in order to improve the strength and handling ability of the finished product so that the granules are less likely to wear or break down during handling or transport, as described in U.S. Pat. No. 7,727,501, entitled "Compacted granular potassium chloride, and method and apparatus for production of same," incorporated herein by reference in its entirety. A binding agent is a chemical that is added into the feed of a compaction circuit to improve the strength and quality of compacted particles. The binding agent acts to sequester or chelate impurities in the fertilizer feedstock, while providing adhesive properties to the compacted blend. Binding agents can include, for example, sodium hexametaphosphate (SHMP), tetra-sodium pyrophosphate (TSPP), tetra-potassium pyrophosphate (TKPP), sodium tri-polyphosphate (STPP), di-ammonium phosphate (DAP), mono-ammonium phosphate (MAP), granular mono-ammonium phosphate (GMAP), potassium silicate, sodium silicate, starch, dextran, lignosulfonate, bentonite, montmorillonite, kaolin, or combinations thereof. In addition to or alternatively to the binding agents, some of the micronutrients themselves can act as binding agents to improve particle strength.

According to an embodiment of the invention, a cohered granular the NPK fertilizer product containing at least two sources of boron is made by blending a first source of boron having a first solubility and a second source of boron having a second solubility less than the first source into a primary nutrient feed of a compaction circuit. The sources of boron can be added to the feed in advance of compaction, and can either be added separately to the feed, or can be bulk blended prior to their addition to the feed. The compaction of this blended feed stock and then conventional further processing, such as crushing and sizing, yields cohered fertilizer granules containing at least two sources of boron that are evenly distributed throughout the granular product.

A production line or production circuit for producing the compacted granular fertilizer composition generally includes a material feed apparatus such as a belt conveyor, pneumatic conveyor or the like which input various particulate primary nutrient streams, screenings, recovered or discarded material, the first and second sources of boron, one or more optional secondary nutrients and/or micronutrients, and one or more optional binding agents to a compactor. The compactor then presses the feed material at elevated pressures into a cohered intermediate sheet or cake, which can then be crushed, classified, resized, or otherwise refinished into a desired finished granular product containing the at least two sources of boron.

Figure 8:
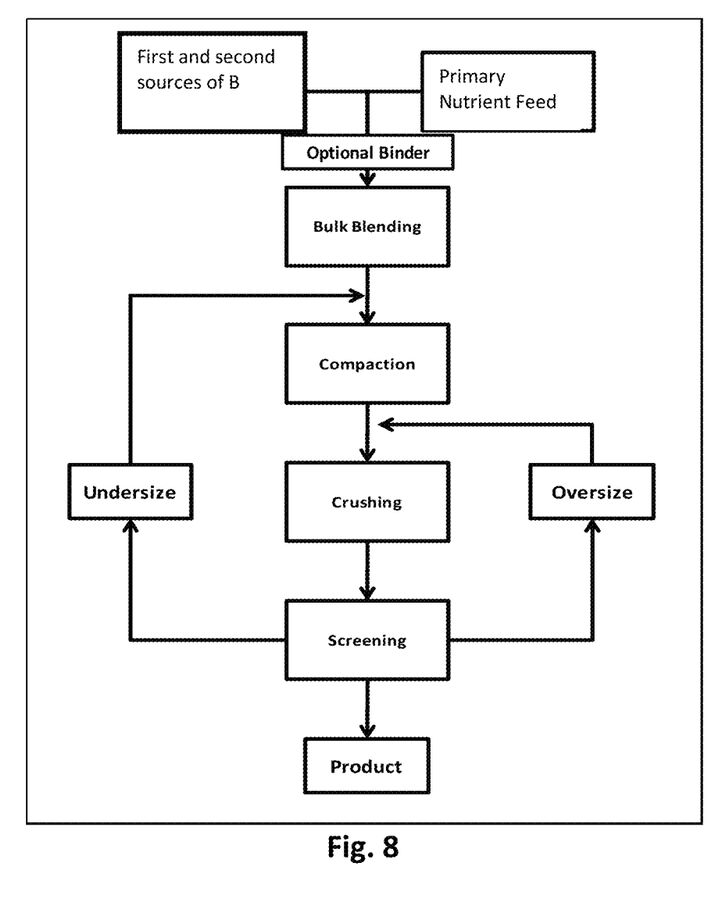
FIG. 8 is a process flow diagram for a compaction circuit according to an embodiment.

FIG. 8 is a flow chart illustrating the steps involved in one contemplated embodiment of the method of production of the present invention. Specifically, FIG. 8 shows the injection of a boron sources, either blended or separately, into the primary nutrient feed of a production circuit. The boron sources can be added to the feed material at various locations in the circuit by one or more injectors including metering equipment to allow more precise control of the amounts of each component added per unit of feedstock.

After addition of the boron sources and optional binding agent(s) to the feed material, the additives and feed material are blended. The blending step can either take place passively, by allowing these materials to come together or blend during their joint carriage through the feed mechanism, or alternatively there may be specific blending equipment added to the production circuit between the injector and the compactor to provide more aggressive or active blending of the boron sources, optional binders, optional other additives, and feedstock prior to compaction.

The blended feed material, now properly mixed with the boron sources and optional other additives, is then compacted. The compaction process can be performed using conventional compaction equipment such as a roll compactor or the like. The cohered intermediate composition yielded can then be further processed into the desired finished granular product using methods such as crushing, screening or other conventional classification methods suitable to yield a finished product of the desired particle size or type, as depicted in FIG. 8.

It will be understood that any attendant process or equipment modifications to permit the addition of one or more additional micronutrients, secondary nutrients, and/or binding agents, either concurrently or separately, to the feedstock are contemplated within the scope of the present invention.

The following examples further exemplify embodiments of the present application.

EXAMPLES

Trial 1: Column Dissolution

Figure 1:
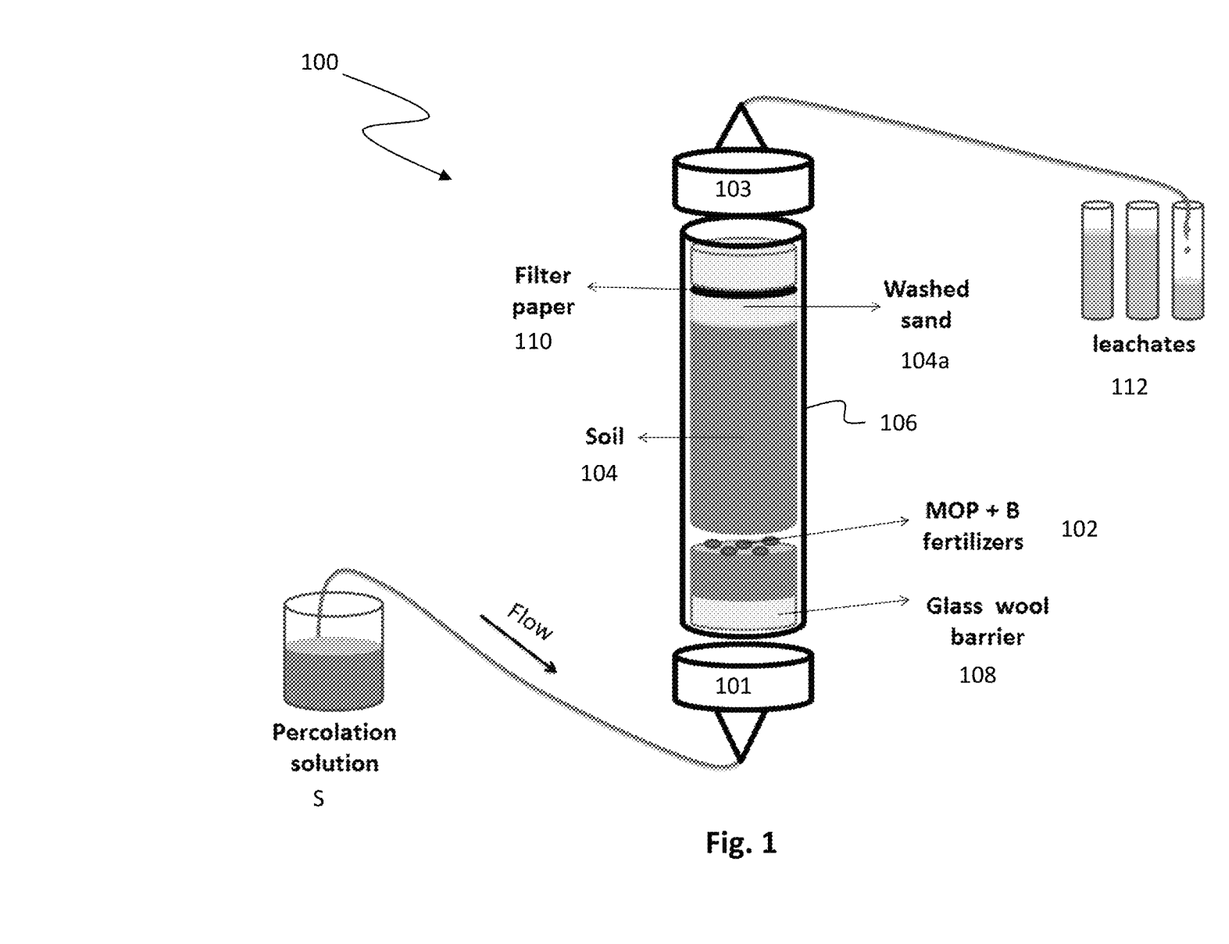
FIG. 1 depicts a perfusion cell assembly for analyzing leached boron from soil according to an embodiment of the invention.

MOP fines were compacted with varying proportions of boron from borax and colemanite, to give a total boron content of about 0.5 wt % of the fertilizer granule. The varying proportions of boron supplied as borax to colemanite were 1:0 (i.e. no colemanite), 1:1, 1:3, and 0:1 (i.e. no borax). Dissolution of boron from the granules was measured over 72 hours using a column perfusion technique. Referring to FIG. 1, the column perfusion technique uses a perfusion cell assembly 100 in which a known weight of fertilizer 102 is embedded within a volume of soil 104 in a vertical column cell 106. A percolation solution S is pumped from bottom to top through a glass wool barrier 108 followed by the soil 104 which encloses the fertilizer sample 102 and a portion of acid washed sand 104*a*. The top end 103 includes a filter paper 110 so that soil is not removed with the collected leachates 112.

In this particular perfusion example, a one-gram sample of fertilizer product was embedded within the column of soil. The percolation solution was 10 mM $CaCl_2$, having a pH of about 6, and was introduced into the column at a flow rate of 10 mL/h.

Figure 2:
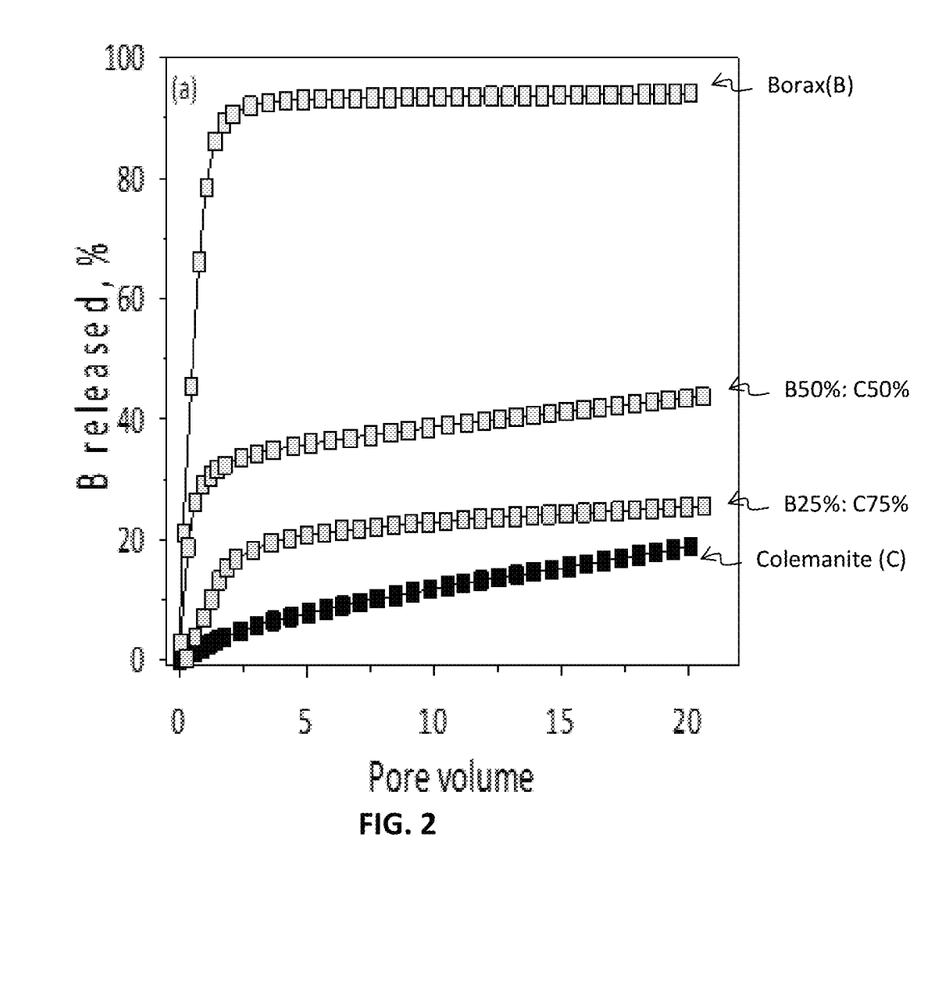
FIG. 2 is a plot of a weight percent of boron released as a function of pore volume (i.e. a time series of boron leaching) for various formulations in a perfusion cell assembly according to an embodiment of the invention.

The results of the perfusion technique are depicted in the graph of FIG. 2, in which the weight percent of boron released (i.e. captured in the leachates) per composition was plotted, showing that the fast and slow release characteristics can be tailored by varying the proportions of borax to colemanite.

Trial 2: Pot Trials

Pot trials were performed using canola plants, a MOP fertilizer control (without boron), and the same four fertilizer formulations as used in Trial 1, consisting of MOP with 0.5% boron and varying ratio of fast (borax) to slow release boron (colemanite) (Table 2). The soil consisted of 1 kg per pot of Mt. Compass sandy loam, the chemical analysis of which is set forth in Table 3 below. The boron source was added at an equivalent rate of 1.5 kg boron/hectare, which corresponded to 0.9 mg boron and 86.6 mg K per 1-kg pot. There were five replicates for each fertilizer treatment.

TABLE 2

Comparison of acid extrable and water extractable B

| Fertilizer | Ratio B % | Acid extractable K (%) | Acid extractable B (%) | Water extractable B (%) | B as % total |
|---|---|---|---|---|---|
| MOP + Borax | 100 | 45.1 | 0.57 | 0.52 | 90.0 |
| MOP + Colemanite | 100 | 46.1 | 0.53 | 0.06 | 10.8 |
| MOP + Colemanite:Borax | 50:50 | 48.6 | 0.60 | 0.29 | 49.0 |
| MOP + Colemanite:Borax | 75:25 | 48.5 | 0.61 | 0.18 | 48.6 |
| MOP + Ulexite | 100 | 47.0 | 0.43 | 0.28 | 65.1 |
| MOP + Ulexite:Borax | 50:50 | 46.5 | 0.59 | 0.29 | 29.2 |

TABLE 3

Selected characteristics of the Southern Australia soil used in the experiments

| Soils | Sand |
|---|---|
| Location | Mt Compass |
| pH (water) | 5.9 |
| pH (CaCl$_2$) | 4.9 |
| Total C (%) | 0.5 |
| CEC (cmol$_c$ kg$^{-1}$) | 2.0 |
| Hot water extractable B (mg kg$^{-1}$) | 0.20 |
| CaCO$_3$ (%) | <0.2 |
| Clay (%) | 4.3 |
| Silt (%) | 0.9 |
| Sand (%) | 96.3 |
| Field capacity (%) | 3.5 |

Figure 3:
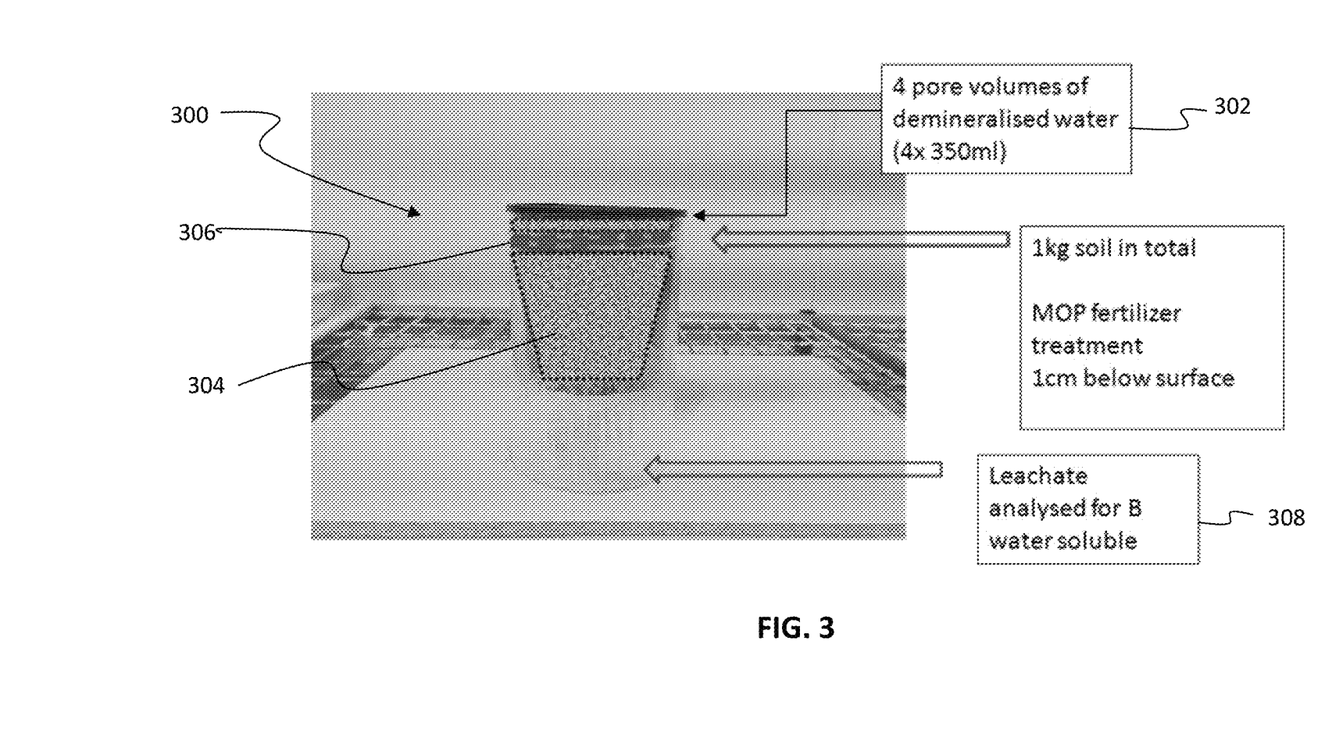
FIG. 3 is a pot trial assembly for analyzing boron availability according to an embodiment of the invention.
Figure 4:
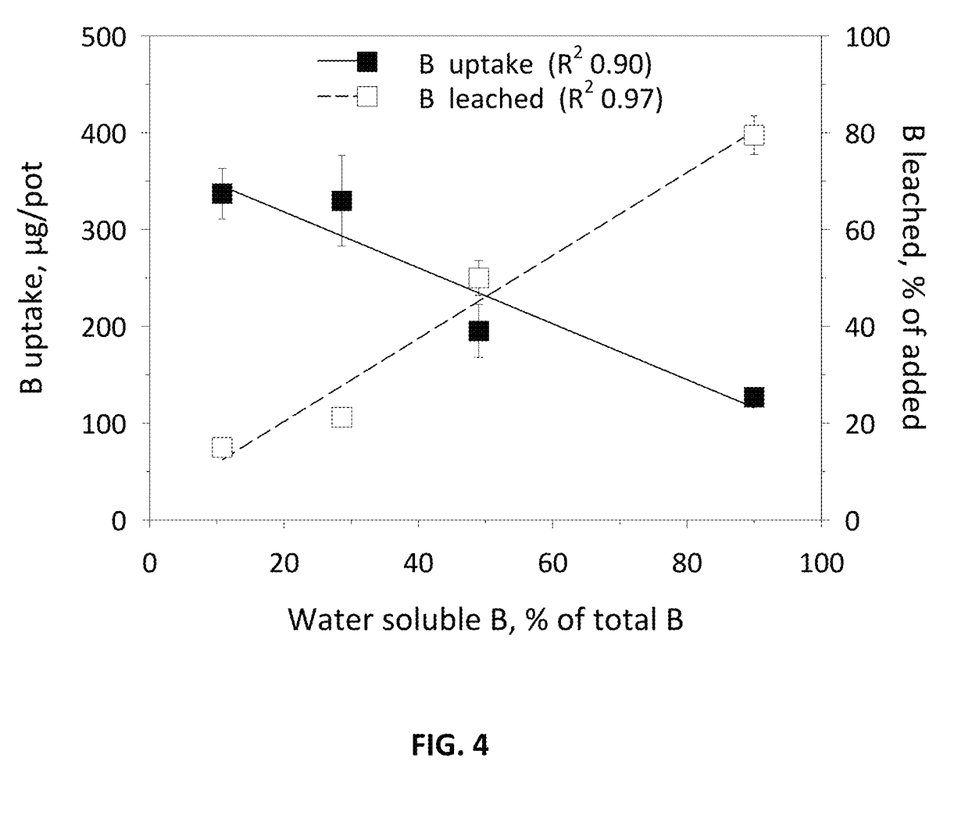
FIG. 4 is a plot comparing boron uptake per pot in leached treatments and boron leached as a percent of added boron versus water-soluble boron as a percent of total boron in a pot trial assembly.
Figure 5:
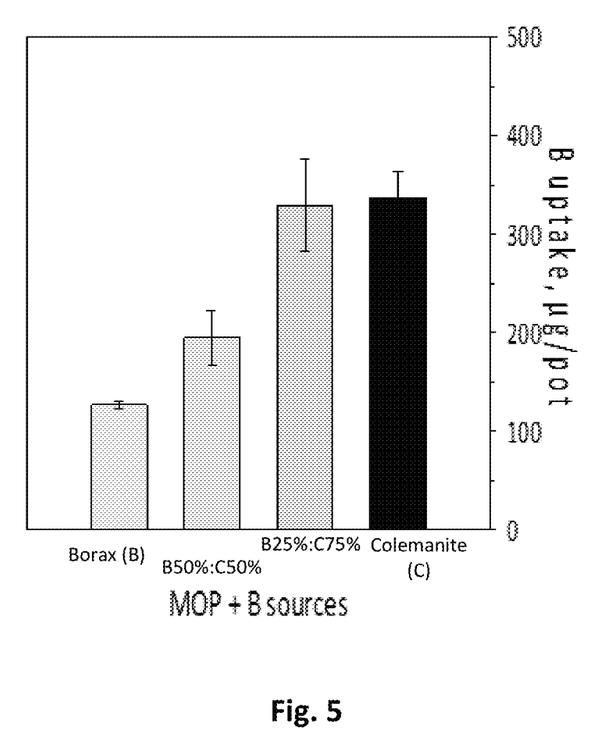
FIG. 5 is a plot comparing boron uptake per pot per formulation in a pot trial assembly.

In this trial, thirty of the pots were leached, and thirty pots were not leached prior to planting the canola crop. Referring to FIG. 3, the leached pots 300 were leached by applying four pore volumes 302 (or 350 mL×4) of demineralized water to the 1 kg of soil 304 to which the MOP fertilizer 306 was applied at 1 cm below the surface of the soil 304. The leachate 308 captured at the bottom of the pot 300 was analyzed for boron. The amount of boron leached from the pots 300 decreased with increasing amount of slow-release boron in the fertilizer (FIG. 4). The canola plant crop was then planted and allowed to grow for about twelve weeks, and was then analyzed for boron concentration in the plant shoots. As depicted in FIG. 7, the non-leached pots 700 at varying formulations outgrew the leached pots 702 at the same formulations As shown in Table 2, and FIG. 2 (column perfusion), 4 (pot trial), 5 (pot trial) and 6 (pot trial), in both the column perfusion and pot trial techniques, it was observed that as the percentage of water soluble boron increases, the release rate of boron increases and boron uptake by plants decreases, while having minimum effect on acid extractable K.

Figure 6:
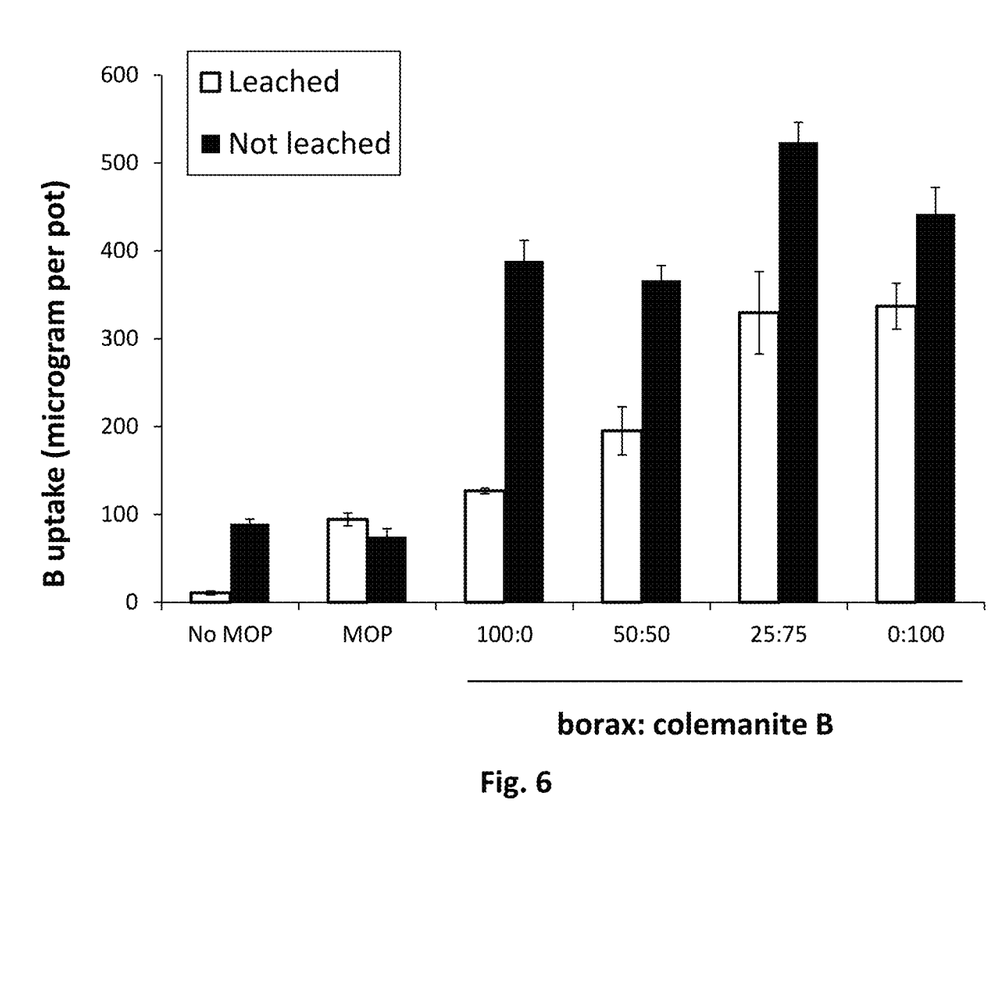
FIG. 6 is a graph depicting boron uptake per pot in leached or unleached pots for six fertilizer treatments in a pot trial assembly.
Figure 7:
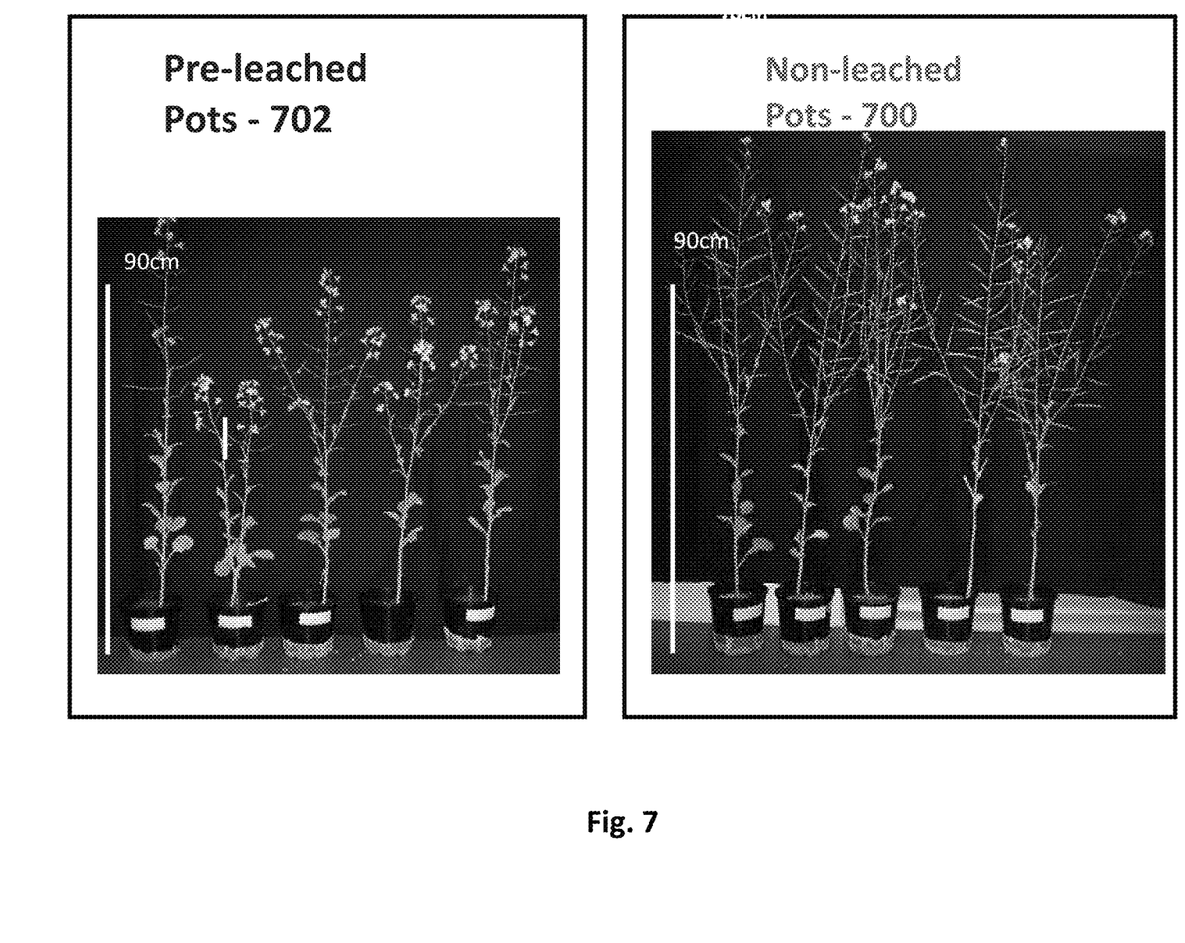
FIG. 7 is a side by side comparison of canola plants grown in pre-leached pots versus plants grown in non-leached pots for different formulations in a pot trial assembly according to an embodiment.

Referring specifically to FIG. 6, the plant uptake of boron per pot was measured after twelve weeks. In the unleached pots, there was no consistent effect of boron fertilizer formulation on the uptake of boron. For the leached pots, the plant uptake of boron increased as the amount of slow-releasing boron from colemanite increased in the fertilizer formulation.

From these trials, it has been determined boron uptake can be improved with the balance of slow release boron and fast release boron, and that the addition of a slow release source of boron to a macronutrient fertilizer provides an excellent supply of boron in leaching environments over the course of a plant's growing season.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A granular fertilizer product comprising granules formed from a compacted muriate of potash composition, the composition comprising:
   muriate of potash containing from about 48.0 weight percent to about 62.0 weight percent K$_2$O;
   a first source of boron having a first solubility, wherein the first source of boron is sodium tetraborate; and
   a second source of boron having a second solubility lower than the first solubility, wherein the second source of boron is colemanite,
   wherein the first source of boron is configured to be released from the granules at a faster rate than the second source of boron.

2. The granular fertilizer product of claim 1, wherein the first and second sources of boron are present in an amount in the fertilizer granule to provide a total amount of from about 0.001 weight percent (wt %) to about 1.0 wt % B.

3. The granular fertilizer product of claim 2, wherein the first and second sources of boron are present in a total amount of from about 0.1 wt % to about 0.7 wt % B.

4. The granular fertilizer product of claim 3, wherein the first and second sources of boron are present in a total amount of from about 0.3 wt % to about 0.6 wt % B.

5. The granular fertilizer composition product of claim 1, wherein a ratio of the first source of boron to the second source of boron is selected from: 5:1, 4:1, 3:1, 2:1, 1:1, 1:2, 1:3, 1:4, or 1:5.

6. The granular fertilizer product of claim 5, wherein a ratio of the first source of boron to the second source of boron is 1:1.

7. A method of forming a granular fertilizer product containing multiple sources of boron, the method comprising:
providing a fertilizer composition containing a primary nutrient source comprising muriate of potash containing from about 48.0 weight percent to about 62.0 weight percent $K_2O$, a first source of boron having a first solubility, and a second source of boron having a second solubility less than the first source, wherein the first source of boron is sodium tetraborate and the second source of boron is colemanite;
compacting the composition; and
crushing the compacted fertilizer composition into fertilizer granules,
wherein the first source of boron is configured to be release from the fertilizer granules at a rate faster than the second source of boron.

8. The method of claim 7, wherein the first and second sources of boron are present in an amount in the fertilizer granule to provide a total amount of from about 0.001 weight percent (wt %) to about 1.0 wt % B.

9. The method of claim 8, wherein the first and second sources of boron are present in a total amount of from about 0.1 wt % to about 0.7 wt % B.

10. The method of claim 9, wherein the first and second sources of boron are present in a total amount of from about 0.3 wt % to about 0.6 wt % B.

11. The method of claim 7, wherein a ratio of the first source of boron to the second source of boron is selected from: 5:1, 4:1, 3:1, 2:1, 1:1, 1:2, 1:3, 1:4, or 1:5.

12. The method of claim 7, further comprising:
classifying the fertilizer granules by size.

13. The method of claim 7, further comprising:
providing a micronutrient in addition to the first and second sources of boron, wherein the micronutrient is selected from the group consisting of zinc (Zn), manganese (Mn), molybdenum (Mo), nickel (Ni), copper (Cu), sulfur (S) in its elemental form, sulfur in its oxidized sulfate form ($SO_4$), and combinations thereof.

14. The method of claim 7, wherein each of the sources of boron are blended together before their addition into the muriate of potash and before compaction.

15. The method of claim 7, wherein each of the first and second sources of boron are added separately to the muriate of potash before compaction.

16. The method of claim 7, further comprising adding a binding agent before compaction.

17. The method of claim 16, wherein the binding agent is selected from the group consisting of sodium hexametaphosphate (SHMP), tetra-sodium pyrophosphate (TSPP), tetra-potassium pyrophosphate (TKPP), sodium tri-polyphosphate (STPP); di-ammonium phosphate (DAP), mono-ammonium phosphate (MAP), granular mono-ammonium phosphate (GMAP), potassium silicate, sodium silicate, starch, dextran, lignosulfonate, bentonite, montmorillonite, kaolin, and combinations thereof.

18. The method of claim 11, wherein a ratio of the first source of boron to the second source of boron is 1:1.

* * * * *

UNITED STATES PATENT AND TRADEMARK OFFICE
CERTIFICATE OF CORRECTION

PATENT NO. : 10,717,682 B2
APPLICATION NO. : 15/943161
DATED : July 21, 2020
INVENTOR(S) : Michael John McLauglin et al.

Page 1 of 1

It is certified that error appears in the above-identified patent and that said Letters Patent is hereby corrected as shown below:

In the Claims

Column 9, Line 27, Claim 7:
Delete "release" and insert --released--.

Signed and Sealed this
Fifteenth Day of September, 2020

Andrei Iancu
*Director of the United States Patent and Trademark Office*